United States Patent [19]

Rassbach et al.

[11] 3,724,030
[45] Apr. 3, 1973

[54] TWISTABLE NOZZLE DEVICE FOR A SAUSAGE FILLING APPARATUS

[75] Inventors: Felix Rassbach; Rolf Büttner, both of Wiesbaden, Germany

[73] Assignee: Kalle Aktiengesellschaft, Wiesbaden-Biebrich, Germany

[22] Filed: Dec. 29, 1970

[21] Appl. No.: 102,296

[30] Foreign Application Priority Data

Dec. 31, 1969 Germany.....................P 19 65 672.5

[52] U.S. Cl.......................................................17/41
[51] Int. Cl.............................................A22c 11/02
[58] Field of Search..........................17/33, 34, 41, 35

[56] References Cited

UNITED STATES PATENTS

| | | | |
|---|---|---|---|
| 3,010,144 | 11/1961 | Kochjohann | 17/34 |
| 3,140,509 | 7/1964 | Muller | 17/33 |
| 3,457,588 | 7/1969 | Myles et al. | 17/41 |

Primary Examiner—Lucie H. Laudenslager
Attorney—James E. Bryan

[57] ABSTRACT

This invention relates to an improvement in a twistable nozzle device for filling shirred sausage casings and twisting the filled casings in which the mouthpiece of the pipe of the nozzle device is made of an elastic material and is surrounded by an annular nozzle with a tapered bore whereby an annular passage is formed between the nozzle and the mouthpiece of such an adjustable width that a sausage casing fed therethrough is restrained and in which the smallest cross-section of the nozzle is at or closely ahead of the orifice cross-section of the mouthpiece of the nozzle device, the improvement comprising a passage having a length of 10 to 25 mm in the nozzle ahead of the orifice cross-section of the pipe of the twistable nozzle device, the base of which passage substantially corresponds to the outside diameter of the mouthpiece of the pipe of the nozzle device.

3 Claims, 2 Drawing Figures

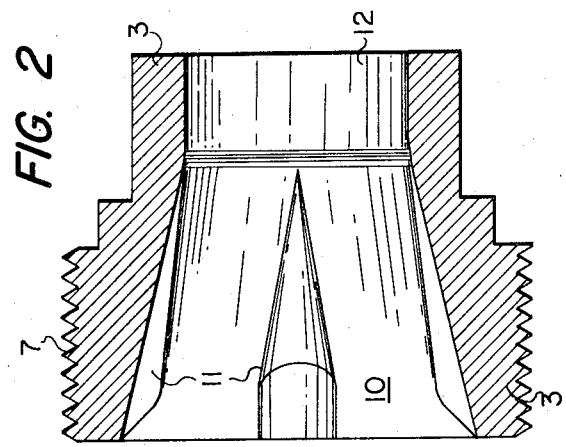
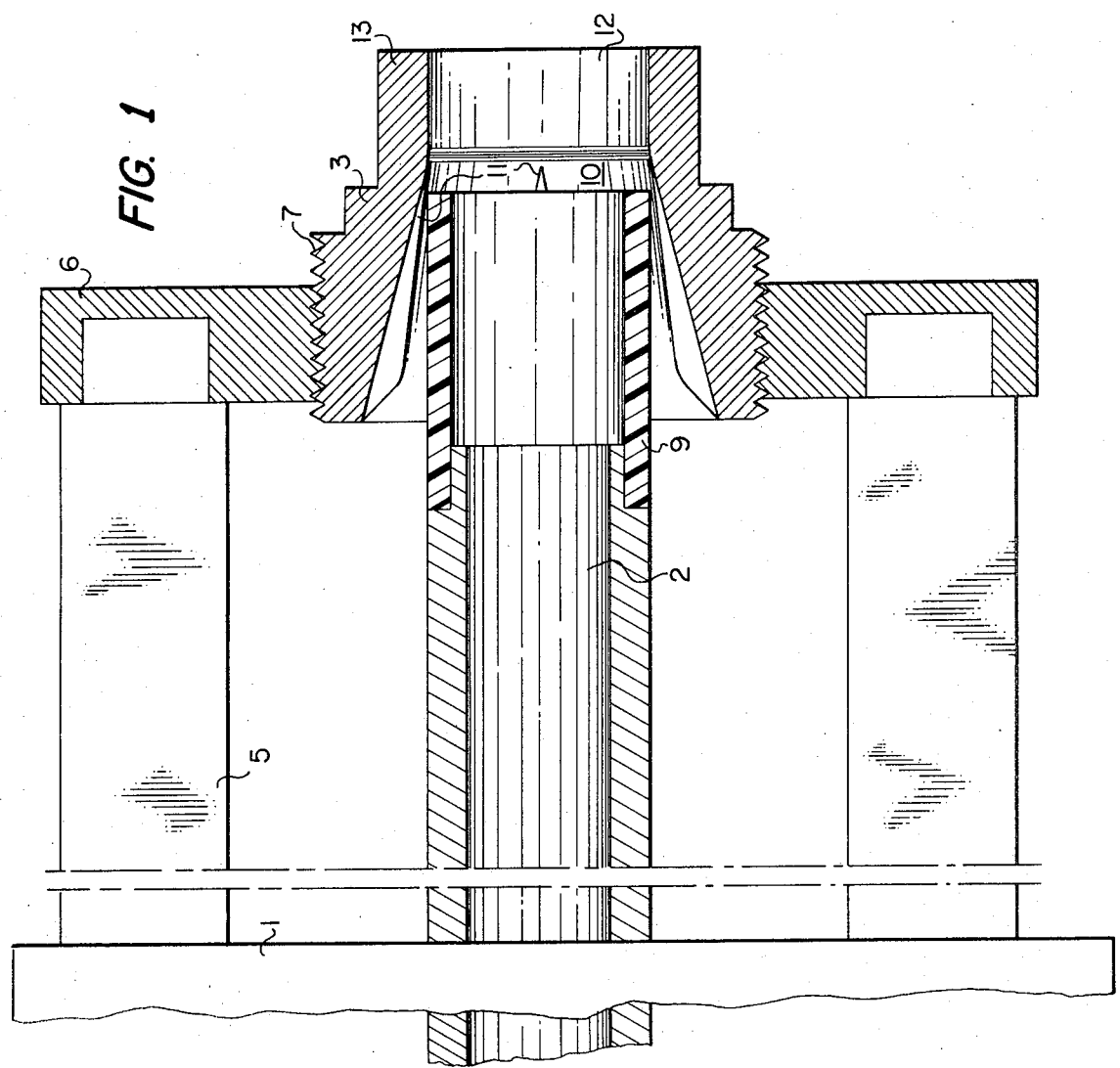

TWISTABLE NOZZLE DEVICE FOR A SAUSAGE FILLING APPARATUS

This invention relates to a novel embodiment of a known twistable nozzle device which is used in an apparatus for filling sausage emulsion into shirred artificial sausage casings.

Artificial sausage casings, for example of regenerated cellulose, inter alia, have the advantage that they are produced in long pieces with uniform cross-sections and thus can be filled more easily than natural sausage casings which are of limited length and have non-uniform cross-sections. Particularly easy is the filling of artificial sausage casings which are shirred, i.e., compressed to such a small fraction of their length, with pleat formation, that a central passage remains open which permits placing the shirred sausage casing onto a rod or pipe.

Many devices are known which serve for filling such shirred sausage casings with sausage emulsion. Among them, there are devices by means of which the sausage is filled with the emulsion in portions and twisted after every filling operation. With these known devices, the shirred sausage casing is pushed onto a pipe-shaped nozzle device through which the sausage casing is filled with sausage by means of a filling device. First, the one end of the sausage casing pushed onto the nozzle is deshirred, drawn from the nozzle device and clamped or otherwise closed ahead of the orifice of the nozzle device. The portion of sausage emulsion pressed out of the orifice of the nozzle device during the operation of the portioning pump then, corresponding to its volume, draws part of the sausage casing from the pipe of the nozzle device until practically the entire length of the sausage casing is filled in portions with sausage emulsion.

In some of the known apparatuses, the nozzle device may be twisted with the shirred part of sausage casing thereon about its longitudinal axis each time an individual portion of sausage emulsion has been pressed out. Therefore, it is called a twistable nozzle device. During rotation, the part of sausage casing ahead of the orifice and filled with a portion of sausage emulsion is prevented from performing the rotation with the twistable nozzle device. In this manner, the individual portions of sausage emulsion pressed in the sausage casing are separated from one another by twisted parts of the sausage casing.

In these apparatuses, it is important to provide a certain resistance to drawing-off the sausage casings from the twistable nozzle device so that the sausage casings are filled under tension and drawn-off from the twistable nozzle device. In a known apparatus, feeding of the sausage casing from the nozzle device is restrained by an annular nozzle surrounding the mouthpiece of the twistable nozzle device. The mouthpiece is made of an elastic material, for example, of natural or artificial rubber or rubber-like material, and forms an annular passage between itself and the nozzle which has such a small width that a tube fed from the nozzle device through the passage is squeezed somewhat and thus restrained. The bore of the nozzle is tapered, viewed in the direction of the passage, to a width approximately corresponding to the outside diameter of the twistable nozzle device. This smallest cross-section of the nozzle is directly at or not more than 1 to 2 mm ahead of the orifice cross-section of the mouthpiece of the twistable nozzle device and may be advanced thereto or removed therefrom by means of a thread in order to make the annular passage narrower or wider so that restraining of the sausage casing is increased or decreased. Such a twistable nozzle device is described in German Published Pat. application No. 1,432,569.

The known apparatus has proved very useful, particularly because it can be adapted to the individual requirements by adjusting the nozzle. Sometimes, it may happen in practical use of the apparatus that the machine, during filling of a shirred sausage casing length, works unsatisfactorily, that particularly the twists between the individual sausage portions are not narrow enough, and sometimes are even opened so that, at the end, two sausage portions instead of one are included between two twists. As could have been expected in the course of tests in connection with the present invention, this failure of the apparatus is connected with the fact that the apparatus is so sensitive to slight quality changes of the sausage casing, which may occur within a shirred length of sausage casing, that the above drawbacks may occur.

The present invention improves the known apparatus for filling sausage emulsion into shirred sausage casings and twisting the filled sausage casings. The mouthpiece of the twistable nozzle device consists of an elastic material and is surrounded by an annular nozzle with a tapered bore so that an annular passage is formed between the nozzle and the mouthpiece of such an adjustable width that a sausage casing fed therethrough is restrained and in which the smallest cross-section of the nozzle is at or closely ahead of the orifice cross-section of the mouthpiece of the twistable nozzle device. The apparatus is improved to be less sensitive to disturbances, and particularly to make the twists between the individual portions filled in the sausage casings with a greater reliability in a satisfactory manner. The improvement which is achieved by the present invention is that the nozzle has a passage of a length of 10 to 25 mm, preferably of 10 to 20 mm, ahead of the orifice cross-section of the pipe of the twistable nozzle device, the bores of which passage substantially correspond to the outside diameter of the mouthpiece of the pipe of the nozzle device. The characteristic feature of the invention is that the sausage casing fed from the mouthpiece of the pipe of the nozzle device is fed on a longer path than hitherto through a passage of relatively small bores. In the simplest and thus preferred embodiment, the passage has a constant bore. It may be formed by a 10 to 25 mm long cylindrical pipe section which is mounted ahead of the orifice of the nozzle of the above-described known apparatus. The pipe section and the nozzle also may be made in one piece.

The bore of the passage must substantially correspond to the outside diameter of the mouthpiece of the pipe of the nozzle device, i.e., it is either of the same diameter or not more than 2 mm larger than that diameter. With a pipe of a nozzle device of an outside diameter of 24 mm for filling an artificial shirred sausage casing which, in the filled state, has an outside diameter of 40 to 42 mm, the desired result was achieved, for example, by providing a passage of a length of 15 mm and a constant bore of 23.8 mm. With a passage of an increasing or decreasing bore, the difference between the individual bores of the passage are limited in that none of the bores is by more than 2 mm larger or smaller than the outside diameter of the mouthpiece of the pipe of the nozzle device.

The invention will be further illustrated by reference to the accompanying drawings in which:

FIG. 1 is a longitudinal view in cross-section of a twistable nozzle device according to the invention, and FIG. 2 shows, on larger scale than FIG. 1, the nozzle of the twistable nozzle device shown in FIG. 1.

The shown twistable nozzle device comprises a holder 1, a pipe 2 and a nozzle 3. The holder 1 serves for holding the pipe 2 and the nozzle 3. The pipe 2 of the nozzle device has a mouthpiece 9 of the above-mentioned elastic material. The nozzle 3 has a passage 10 tapered towards the output end of the nozzle. In this passage, there are bulge-like ledges 11 influencing pleating of the compressed sausage casing. By means of the thread 7, the position of the nozzle 3 can be changed with respect to the mouthpiece 9 of the pipe of the nozzle device so that the smallest cross-section of the nozzle may be advanced as closely as desired to the orifice cross-section of the mouthpiece 9 of the pipe of the nozzle device.

Insofar as the apparatus shown in FIGS. 1 and 2 has been described, it is known. The novelty of the invention is the passage 12 of a length of 10 to 25 mm, which is formed by a passage piece 13 being part of the nozzle 3. The passage 12 of the passage piece 13 of the nozzle 3 preferably has a bore corresponding to the outside diameter of the mouthpiece of the pipe of the nozzle device, or differs therefrom by not more than 0.5 mm, and preferably has a length of 10 to 20 mm.

The twistable nozzle device of the invention has the advantage that it assures, with a greater reliability than hitherto known twistable nozzle devices, that the twists of the sausage casing between two successive portions of filled sausage emulsion are of sufficient stability. Another advantage is that the twistable nozzle device effects that the twists of the sausage casing are positioned more exactly in the center line of the sausage casing, which means that a possible cause for disturbances during mechanical clipping later on is diminished.

It will be obvious to those skilled in the art that many modifications may be made within the scope of the present invention without departing from the spirit thereof, and the invention includes all such modifications.

What is claimed is:

1. In a twistable nozzle device for filling shirred sausage casings and twisting the filled casings in which the mouthpiece of the pipe of the nozzle device is made of an elastic material and is surrounded by an annular nozzle with a tapered bore whereby an annular passage is formed between the nozzle and the mouthpiece of such an adjustable width that a sausage casing fed therethrough is restrained and in which the smallest cross-section of the nozzle is at or closely ahead of the orifice cross-section of the mouthpiece of the nozzle device, the improvement comprising a member providing a passage having a length of 10 to 25 mm in the nozzle ahead of the annular orifice cross-section of the pipe of the twistable nozzle device, the bore of which passage substantially corresponds to the outside diameter of the mouthpiece of the pipe of the nozzle device.

2. A twistable nozzle device according to claim 1 in which the passage in said member has a constant bore.

3. A twistable nozzle device according to claim 1 in which the bore of the passage in said member differs by not more than 0.5 mm from the outside diameter of the mouthpiece of the pipe of the nozzle device.

* * * * *

UNITED STATES PATENT OFFICE
CERTIFICATE OF CORRECTION

Patent No. 3,724,030  Dated April 3, 1973

Inventor(s) Felix Rassbach and Rolf Büttner

It is certified that error appears in the above-identified patent and that said Letters Patent are hereby corrected as shown below:

claim 1, lines 12 and 13, "10 to 25 mm in the nozzle ahead of the annular orifice" should read -- 10 to 25 mm in the annular nozzle ahead of the orifice -- .

Signed and sealed this 28th day of August 1973.

(SEAL)
Attest:

EDWARD M. FLETCHER, JR.
Attesting Officer

RENE D. TEGTMEYER
Acting Commissioner of Patents